United States Patent [19]

Morio et al.

[11] Patent Number: 4,944,012
[45] Date of Patent: Jul. 24, 1990

[54] SPEECH ANALYZING AND SYNTHESIZING APPARATUS UTILIZING DIFFERENTIAL VALUE-BASED VARIABLE CODE LENGTH CODING AND COMPRESSION OF SOUNDLESS PORTIONS

[75] Inventors: Tomokazu Morio; Yoshiji Fujimoto, both of Nara; Atsunori Kitoh, Yamatotakada, all of Japan

[73] Assignee: Sharp Kabushiki Kaisha, Osaka, Japan

[21] Appl. No.: 144,478

[22] Filed: Jan. 15, 1988

[30] Foreign Application Priority Data

Jan. 16, 1987 [JP] Japan ................................ 62-8783
Jan. 17, 1987 [JP] Japan ................................ 62-8806

[51] Int. Cl.$^5$ .......................... G10L 7/02; H04B 14/06
[52] U.S. Cl. ........................................ 381/30; 381/31; 375/27
[58] Field of Search ...................... 381/29–32, 381/36–40, 41, 33–35; 375/27, 31, 122; 364/513.5

[56] References Cited

U.S. PATENT DOCUMENTS

| | | | |
|---|---|---|---|
| 3,927,372 | 12/1975 | Zschunke | 325/38 B |
| 4,130,729 | 12/1978 | Gagnon | 381/31 |
| 4,280,192 | 7/1981 | Moll | 381/35 |
| 4,317,208 | 2/1982 | Araseki | 381/31 |
| 4,370,524 | 1/1983 | Hiraguri | 381/29 |
| 4,449,190 | 5/1984 | Flanagan | 364/513.5 |
| 4,586,191 | 4/1986 | Nishimura | 381/31 |
| 4,592,070 | 5/1986 | Chow | 381/31 |
| 4,751,736 | 6/1988 | Gupta | 381/31 |
| 4,802,221 | 1/1989 | Jibbe | 381/30 |

Primary Examiner—Gary V. Harkcom
Assistant Examiner—John A. Merecki

[57] ABSTRACT

A speech analyzing and synthesizing apparatus includes a sampling circuit for sampling an inputted speech signal, a speech analyzer for analyzing and coding the inputted speech signal, and a speech synthesizer for decoding the speech signal coded by said speech analyzer into a synthesized speech, whereby the average code length can be advantageously shortened to realize a low capacity memory and a well-analyzed and synthetized speech. Moreover, a speech recording apparatus is provided wherein a soundless section in the inputted speech signal is compressed by real time, and even a weak short-time portion in the sounded section of an inputted speech signal is not erroneously judged to be soundless, but is coded as a sounded portion.

11 Claims, 7 Drawing Sheets coder side decoder side

SPEECH ANALYZING AND SYNTHESIZING APPARATUS UTILIZING DIFFERENTIAL VALUE-BASED VARIABLE CODE LENGTH CODING AND COMPRESSION OF SOUNDLESS PORTIONS

BACKGROUND OF THE INVENTION

1. Field of the Invention

The present invention relates to a speech analyzing and synthesizing apparatus in which a speech signal is analyzed and coded for transmission and preserved by shortening the average code length and, also to a speech recording apparatus in which a soundless portion of a speech signal to be recorded is compressed when the speech signal is analyzed and coded.

2. Description of the Prior Art

Generally, a large volume of information content is necessary for expressing speech signals. However, since the speech signals have a considerable redundancy, they can be transmitted with high efficiency and recorded with small capacity if they are compressed.

Coding of the speech signals is divided roughly into two methods, that is, waveform coding, and coding in the frequency domain. The waveform coding outputs a fixed length of coded bit (information content) for example, per every sample, while the coding in the frequency domain outputs a fixed length of coded bits for example, per frame. However, it is better to output more bits when the waveform changes severely, bringing about difficulties for prediction, and less bits when the waveform changes slightly, with easy prediction, that is, variable code-length coding is better than waveform coding whereby a fixed length of bit are outputted per every sample, because the average code length can be shortened in the variable code-length coding, which is suitable for recording with small capacity. This can is also true with respect to domain coding.

Conventionally, in the case where there is non-uniformity in the amplitude distribution of a speech waveform, that is, an inclination in the probability distribution of a code indicating each amplitude, the speech signals are coded into variable length codes in which the information (bit length) of each code is changed depending on the appearance frequencies of quantization results, so that the average code length can be shortened. This method is called an entropy coding, such as Huffman code. In the conventional variable code-length coding such as the above-mentioned entropy coding, however, since the coding method is based on statistical characteristics such as generation probability of each information segment in an inputted speech signal, etc., the statistic characteristics must should be studied in advance so as to form a variable length code that can render the entropy a minimum. Moreover, the bit length of a coded signal changes so greatly in the entropy coding that difficult countermeasures against transmission error must be taken.

Also, the speech signals include a soundless pause section in which no sound is generated during speech. Therefore, if the information in the soundless section is compressed, the speech signals can be transmitted with high efficiency, and the recording capacity of the memory can be reduced. Particularly, for a in the normal speaking speed, sounded section in which speech is actually generated covers approximately only 68% of all speaking time, and therefore the compression of the soundless sections can reduce a considerable volume of speech information. In the conventional speech recording and reproducing apparatus, a sound judging means determines once per frame whether the speech signal is a sounded signal or a soundless signal and then the soundless section is compressed. Therefore, when a the speech signal with a compressed soundless section is reproduced, the beginning or the ending of a word in the speech is disadvantageously omitted. Moreover, in the conventional apparatus, a weak short-time section in the inputted speech signal (for example, a double-consonant in Japanese "Gakko", etc. or an assimilated sound) is erroneously judged to be soundless and accordingly erroneously compressed. Therefore, in reproducing the inputted speech signal, the double-consonant portion is treated as a perfect soundless section (for example, "Gako" in Japanese), bringing about a strange and odd feeling in hearing.

SUMMARY OF THE INVENTION

Accordingly, an essential object of the present invention is to provide an improved speech analyzing and synthesizing apparatus in which a particular code among the analyzed codes of an inputted speech signal is outputted as a marker signal which is a variable code-length signal, so that the information content as a result of the coding is changed through a simple operation in accordance with the changing amount of the inputted speech signal, thereby to shortening the average code length, and reducing the recording capacity, and at the same time obtaining such coded characteristics which have less errors.

A further object of the present invention is to provide an improved speech recording apparatus in which the soundless section in the speech signal are adapted to be compressed by real time, and at the same time even the beginning head or the ending of a word or a short-time weak section is not compressed as a soundless section, so that the speech signal can be reproduced with no strange feeling given to a listener.

In accomplishing the above-described first object, according to the present invention, the speech analyzing and synthesizing apparatus is comprised of a speech analyzer and a speech synthesizer. The speech analyzer includes a differential detection means for detecting the differential value between the sampled adjacent speech signals (one is a row signal, another is a predicated signal), a judging means for judging whether or not the differential value obtained by the differential detection means is within an analyzing and coding range in which the speech signal is able to be analyzed and coded by a fixed number of codes, and in which, when the differential value is within the analyzing and coding range, the speech sample is coded within the analyzing and coding range, while, when the differential value is beyond the analyzing and coding range, a value for the number of repetition of the analyzing and coding range necessary for properly coding the sample is calculated, and the sample is coded by the codes including a marker code representing the repetition number. The speech synthesizer is provided with a recoding means for obtaining the differential value between two adjacent speech signals through calculation of the repetition number of the above range on the basis of the marker code included in the codes. Accordingly, in the speech analyzing and synthesizing apparatus of the present invention, the inputted signal is quantized by a sampling means to be inputted to the speech analyzer. The differential value of the speech signals inputted to a speech analyzer is detected by the differential detection means. Then, the differential value is judged by the judging means as to whether it is within the range in which the speech sample is able to be coded by a fixed number of codes. On the basis of the judgment result by the judging means, the speech sample if within the analyzing and coding range is coded by the fixed number of codes in the coding means, whereas if the differential value is beyond the above-described analyzing and coding range, the speech signal is coded into the codes including a marker code representing the value of the number of repetitions of the analyzing and coding range necessary for indicating the differential value, to be outputted.

When the speech signal coded into the codes including the marker signal is inputted to the speech synthesizer, the differential value of the adjacent speech signal is calculated with reference to the repetition number of the analyzing and coding range which is based on the marker signal, so as to be decoded into a synthesized speech.

Further, in accomplishing the above-described second object, according to the present invention, the speech recording apparatus with compression of soundless section includes an encoder for analyzing and coding a speech signal, a sound judging means for judging whether the speech signal is a sounded signal or a soundless signal, a speech code memory for recording speech codes, and two types of address counters which are controlled by the sound judging means, so that the address of the speech code memory is advanced when the speech signal is sounded, while, the address of the speech code memory is turned back when the speech signal is soundless. The speech recording apparatus with compression of soundless sections according to the present invention further includes a delay means by which the coded signal in the speech code memory, the address of which is designated by the address counter, is delayed with respect to the speech signal inputted to the sound judging means, the delay means realized by using a part of the speech code memory as a circulating memory, so that storing of the preceding speech signal into the speech code memory is controlled by the sound judging means. Accordingly, when the speech signal is inputted, the sound judging means 15 detects whether the inputted speech signal is a sounded signal or a soundless signal. As a result of the judgment, when the speech signal is judged to be soundless, the address of the speech code memory is turned back and not advanced, and therefore the coded speech signal is not recorded in the speech code memory. Thus, the soundless section in the sound code memory can be compressed in real time, thereby reducing the recording capacity of the memory. Moreover, when the speech signal inputted adjacent a soundless signal is detected by the sound judging means to be a sounded signal, a delayed speech signal is coded by the encoder, that is, the speech signal is returned to a time before the point where the speech signal is judged to be a sounded signal, to be recorded in the speech code memory; Accordingly, in the speech recording apparatus with compression of soundless signals of the present invention, the speech signal can be recorded without omission of the beginning of a word, resulting in the elimination of a strange sense of hearing in reproduction of the speech signal.

BRIEF DESCRIPTION OF THE DRAWINGS

These and other objects and features of the present invention will become apparent from the following description taken in conjunction with preferred embodiments thereof with reference to the accompanying drawings, in which:

FIG. 1 is a block diagram of a speech analyzing and synthesizing apparatus according to a first embodiment of the present invention;

FIG. 2 is a block diagram of a differential PCM analyzing and synthesizing circuit;

FIG. 3 is a block diagram of an adaptive differential PCM analyzing and synthesizing circuit;

FIG. 4 is a diagram showing the relationship between input and output mid-rise quantizing characteristics and an output code of uniform quantization;

FIG. 5 is a diagram explanatory of the speech waveform coding operation and an outputted code in the apparatus according to the first embodiment;

FIG. 6 is a flow-chart of the coding operation in the apparatus of the first embodiment;

FIG. 7 is a flow-chart of the decoding operation in the apparatus of the first embodiment;

FIG. 8 is a block diagram of a speech recording apparatus arranged to compress soundless signals according to the second embodiment; and FIG. 9 is a diagram explanatory of the operation of the apparatus of FIG. 8.

DESCRIPTION OF THE PREFERRED EMBODIMENTS

Figure 1:
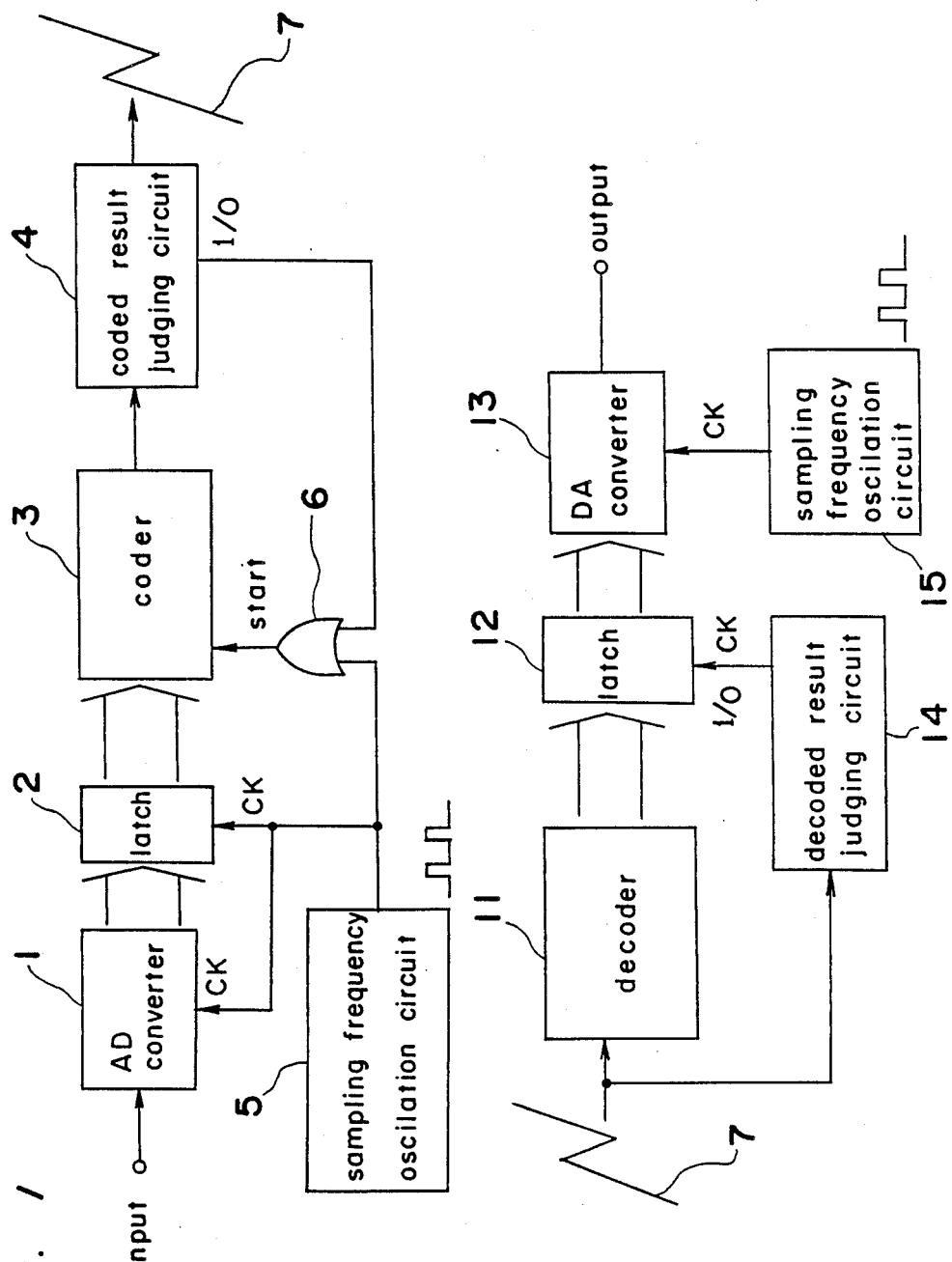
FIGS. 1-7 represent a first embodiment of the present invention.

Before the description of the present invention proceeds, it is to be noted here that like parts are designated by like reference numerals throughout the accompanying drawings.

First Embodiment

In FIG. 1, there is shown a block diagram of a speech analyzing and synthesizing apparatus according to the first embodiment of the present invention, with reference to which the operation of analyzing and coding of a speech waveform will be described.

Figure 2:
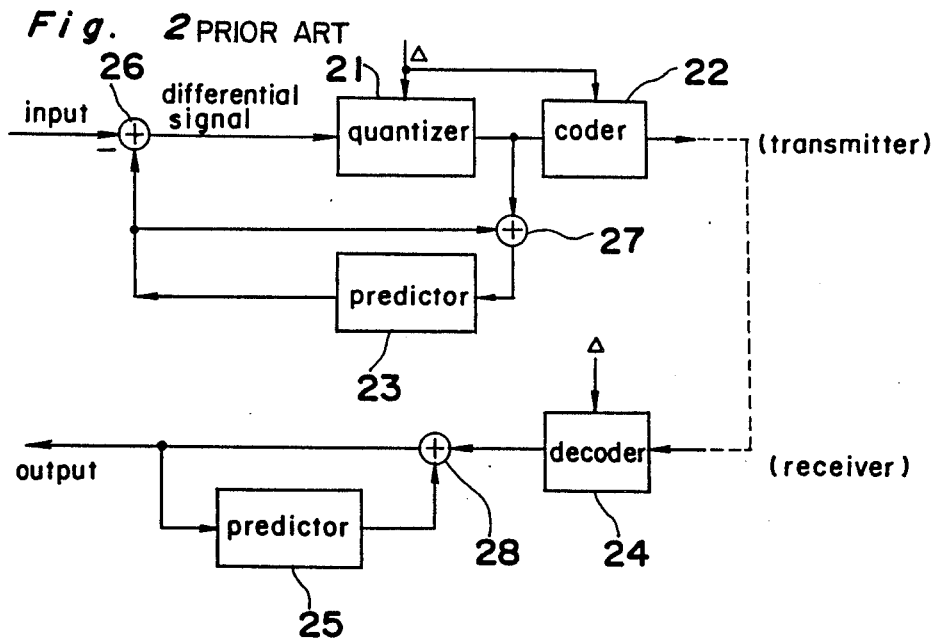
Figure 3:
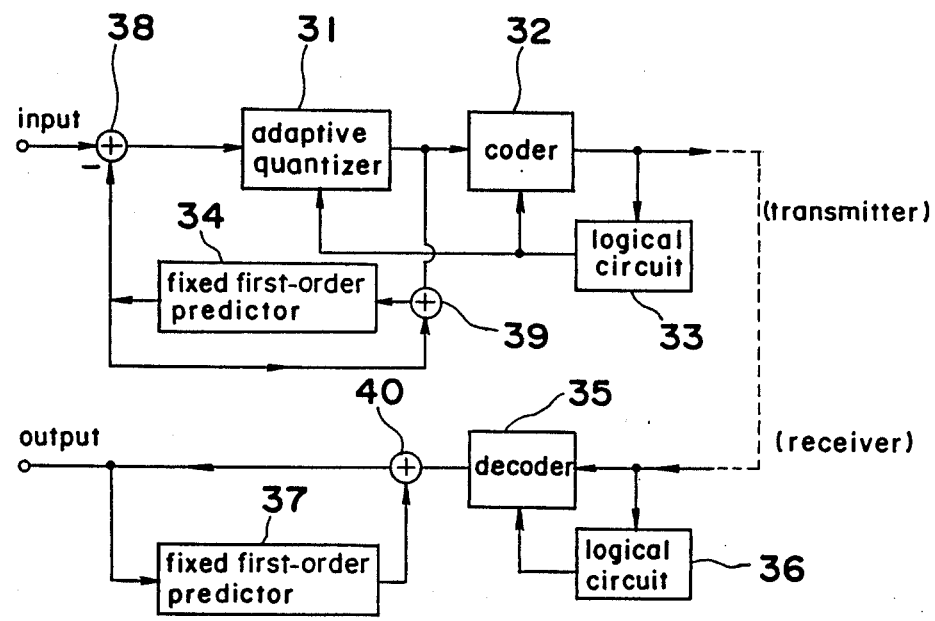

A speech waveform inputted from an input terminal is digitized by an AD converter 1 controlled by a clock signal CK from a sampling frequency oscillation circuit 5. The data digitized in the AD converter 1 is inputted to a latch 2 also controlled by the clock signal CK and held there until a next sample of the speech waveform is AD-converted by a next clock signal CK. The clock signal CK is also inputted to an encoder 3 as a start signal through an OR circuit 6. Because of the start signal, the encoder 3 receives in the digitized data of the inputted waveform which is held in the latch 2 and, codes the digitized data. Thereafter, the encoder 3 outputs the speech code to a judging circuit 4 for judging the result of the coding. It is to be noted here that the above-described encoder 3 can be part of in a differential PCM (pulse code modulation) analyzing and synthesizing apparatus shown in FIG. 2 or an adaptive differential PCM analyzing and synthesizing apparatus shown in FIG. 3, etc. The differential PCM analyzing and synthesizing apparatus of FIG. 2 is comprised of a quantization part 21, a coding part 22, a predictor part 23 at the coding side, a decoding part 24, a predictor member 25 at the decoding side, and adders 26, 27 and 28. On the other hand, the adaptive differential PCM analyzing and synthesizing apparatus shown in FIG. 3 is comprised of an adaptive quantization part 31, a coding part 32, a logic part 33 at the coding side, a fixed first order predictor part 34 at the coding side, a decoding part 35, a logic part 36 at the decoding side, a fixed first predictor part 37 at the decoding side and adders 38, 39 and 40.

Figure 4:
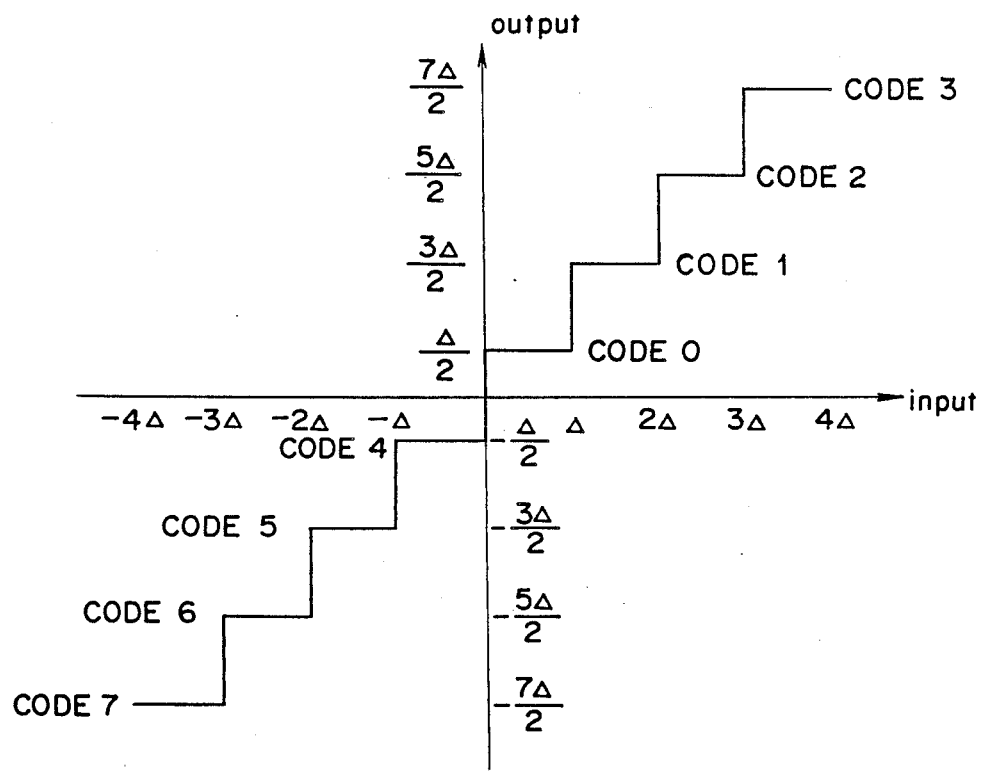

The above judging circuit 4 transmits the inputted speech code to a communication channel 7 or a recording medium, and also detects whether or not the speech code is a both-ends code (for instance, a marker code) within the analyzing and coding range. The aforementioned both-ends code within the analyzing and coding range is such as CODE 3 or CODE 7 in the diagram of FIG. 4 showing the input and output mid-rise quantization characteristics of uniform quantization. In other words, the both-ends code is a code which is outputted when an inputted signal is too large to fall within the quantization (coding) range.

In the case where the inputted code is not the both-ends code, the detection circuit 4 outputs a signal "0" to the OR circuit 6. As a consequence, the OR circuit 6 continues to output "0" until the next clock signal "1" is started, thereby to stop the encoder 3. To the contrary, when the detection circuit 4 detects that the inputted code is the both-ends code, the inputted signal is beyond the coding range, and accordingly, the inputted signal cannot be coded as it is. Therefore, in the case of, for example, the differential PCM system shown in FIG. 2, the detection circuit 4 sends a start signal "1" to the encoder 3 through the OR circuit 6 so as to update the predicted value in the encoder 3 from the predicted value of the both-ends code which has been updated by a previous coding to a next predicted value in a manner to will be described below. As a result of this, the encoder 3 is again inputted the data maintained in the latch 2, so that the predicted value of per one sample of the inputted waveform is repeatedly calculated, thereby to update the predicted value in the encoder 3 to a value which is not the both-ends code.

Figure 5:
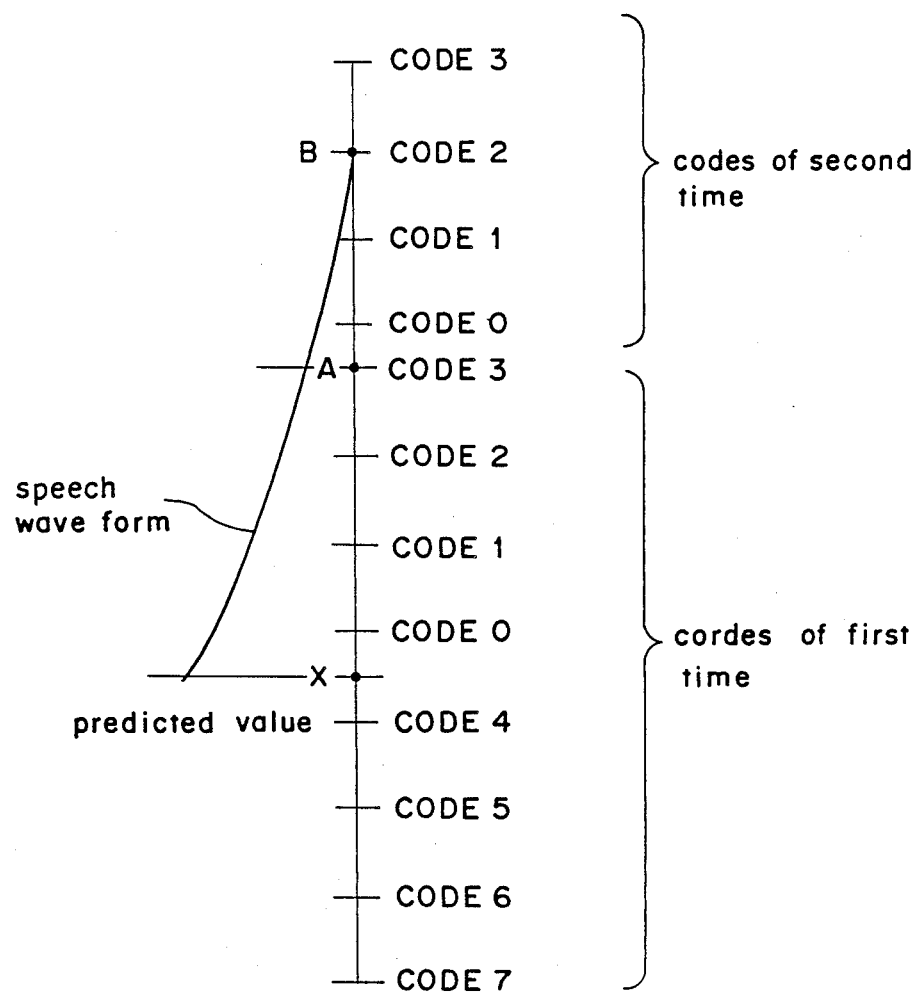
Figure 6:
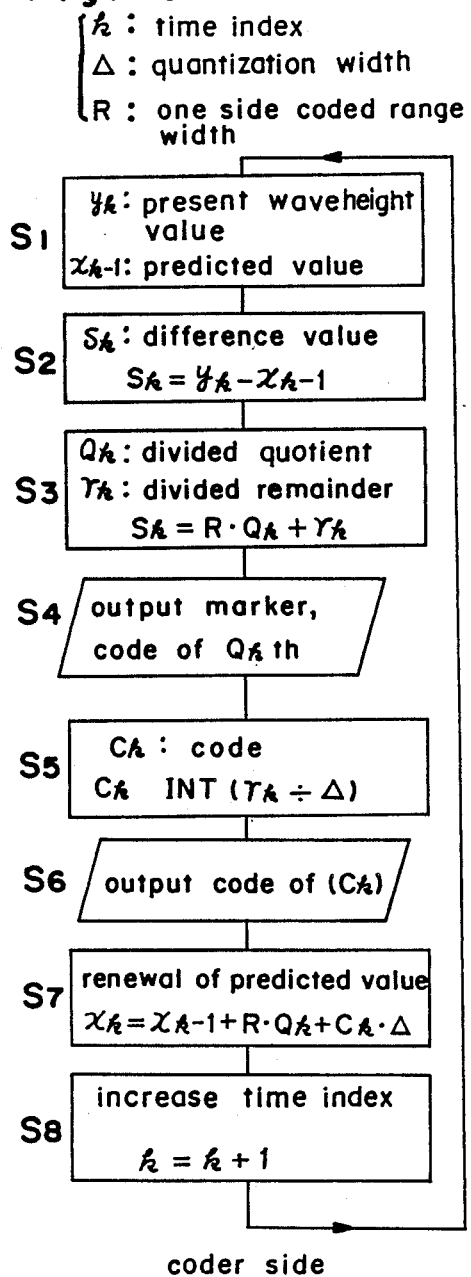

The above-described operation will be explained in detail with reference to FIG. 5. The diagram shown in FIG. 5 is related to the case where the calculation of the predicted value is conducted twice and a code is outputted twice. As will be clear from the diagram of FIG. 5, since the speech waveform changes so largely as to exceed the coding range represented from CODE 7 to CODE 3, the first coding is carried out on the basis of a previous predicted value X. At the first coding, however, the change in the speech waveform cannot be followed at the point A, and therefore CODE 3 is outputted first at the end of the coding range, thereby to renew the predicted value to the point A. Then, when coding is carried out again, the change of the waveform based on the point A comes within the coding range, and CODE 2 is outputted to determine the predicted value at the point B. The encoder ends the calculation of the predicted value when a code other than the both-ends code is outputted as a result of the coding. Therefore, the predicted value is calculated many times as necessary until the encoder outputs a code other than the both-ends code. The calculation operation time must be shorter than the sampling cycle. A flow-chart of FIG. 6 represents in a simplified manner the coding operation applied to the differential PCM system of FIG. 2.

First, in step S1, a value yk of the inputted speech signal at a time index k is received from the latch 2.

A differential value Sk between a previous synthesized value xk−1 which is held inside and the value yk at the time index k is calculated in step S2.

Then, in step S3, the above differential value Sk is divided by a one-side coding range width R to obtain a quotient Qk and a remainder rk.

In step S4, the marker code (i.e., both-ends code) is outputted Qk times. In other words, the marker code is outputted until the present value yk comes within the coding range, thereby to shift the predicted wave height value. Then, the predicted value is calculated, with the flow proceeding to step S5.

In step S5, Ck (Ck=INT(rk÷Δ): wherein Δ is a quantization width) is obtained.

The code Ck is outputted in step S6.

A next predicted value xk is calculated in step S7 by an equation xk=xk−1+R·Qk+Ck·Δ, and the previous predicted value xk−1 is renewed to the value xk.

Thereafter, in step S8, k is increased to establish k=k+1, and the flow is returned to step S1 for coding at the next time index.

The foregoing is the operation at the analyzing side. It should be noted here that the coding range at the second time is half the coding range at the first time. Accordingly, the information (for instance, bit length) of the code after the second time is 1 bit less than that at the first time. However, if a circuit is added to control the renewal of the predicted value depending on the result of the coding or if coding after the second time is carried out by an encoder which has a different coding range (only in one direction), a code of the same bit length as at the first time can be outputted.

Next, the operation to synthesize a speech waveform will be described. Referring to FIG. 1, a decoder 11 calculates digital data of a synthesized waveform on the basis of the code sent through the communication channel 7. The decoder 11 is part of decoder as in the differential PCM analyzing and synthesizing circuit of FIG. 2 or in the adaptive differential PCM analyzing and synthesizing circuit of FIG. 3. A judging circuit 14 detects whether or not the code sent from the communication channel 7 is a both-ends code.

When the code sent from the present communication channel 7 is not a both-ends code, the judging circuit 14 outputs a signal "1" to a latch 12 into which the digital data of the synthesized waveform calculated by the encoder 11 is stored. The digital data is inputted into a DA converter 13 which is controlled by a clock signal CK, generated by a sampling frequency oscillation circuit 15, so as to be outputted as a synthesized speech waveform. In the case where the present code is a both-ends code, the detection circuit 14 outputs a signal "0", and the latch 12 does not store the data from the decoder 11. At the same time, the predicted value, for example, in the decoder 11 of the differential PCM analyzing and synthesizing circuit shown in FIG. 2 is once renewed and maintained at a predicted value which will be a reference value for calculation of the digital data of the synthesized waveform by a next code, and thereafter the next code is input from communication channel 107 to be decoded. Then, when the inputted code is not a both-ends code, the detection circuit 14 outputs a signal "1". As a result of this, the digital data of the synthesized waveform is stored into the latch 12, and DA converted by DA converter 13 to be outputted at output terminal as a synthesized speech waveform. It is to be noted here that the time for calculation of the synthesized waveform must be shorter than the sampling cycle in the synthesizing side as well as in the analyzing side.

Figure 7:
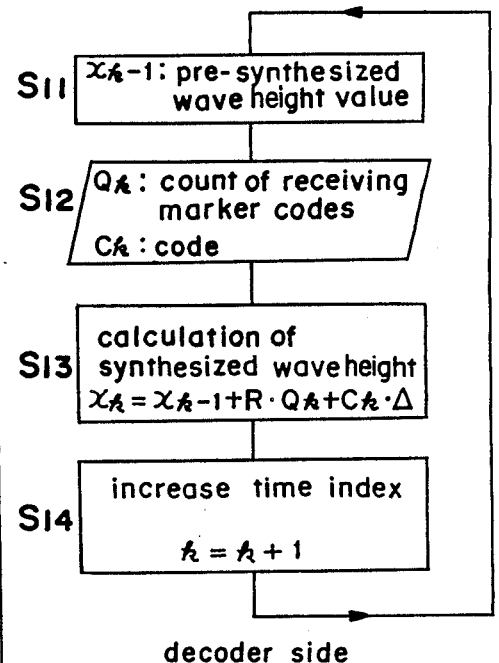

The concrete flow of the coding and decoding operation will be described briefly with reference to FIG. 7.

In step S11, a previous stored synthesized wave height value $xk-1$ is taken into account.

Then, in step S12, it is detected whether or not the inputted speech code is a marker code. The number Qk by which the marker code is successively received and the code Ck indicating the number of the quantization width inputted subsequent to the marker code are inputted.

The synthesized waveform xk is calculated by the use of the equation $xk = xk-1 + R \cdot Qk + Ck \cdot \Delta$ in step S13.

In step S14, the flow is returned to step S11, establishing $k = k+1$, to proceed with decoding at a next time index.

Therefore, in the foregoing embodiment, only by a very simple operation, the inputted speech signal can be changed into a variable length code changing the information content as a result of coding in accordance with the amount of change of the inputted speech signal, or the variable wavelength code can be recorded, resulting in reduction of the average code length.

According to the other embodiment of present invention, an adaptive differential PCM system is employed for coding, in which, when more than two codes are outputted as a result of the analysis the wave height value changes largely, the quantization width thereof is changed. For example, if the quantization width is multiplied by a fixed number, it will have the same effect as a nonlinear quantization. In this adaptive differential PCM system, the analyzing and coding range is expanded, and accordingly it can follow an abrupt change of the waveform, and at the same time, the average code length is able to be limited short, resulting in realization of efficient coding from the viewpoint of the sense in hearing.

Furthermore, in the other embodiment, if a further detection circuit is provided in addition to the circuits 4 and 14, thereby to restrict the maximum number of codes to two in the case where the change of the speech signal is large, the longest operation time can be definitely determined, making realization of the hardware easy.

As is described hereinabove, according to the speech analyzing and synthesizing apparatus of the first embodiment of a present invention, there are provided the speech analyzer and a speech synthesizer. The speech analyzer includes a differential detection means which obtains the differential value of the sampled adjacent speech signals, a judging means for judging whether or not the differential value obtained by the differential detection means is within the analyzing and coding range in which the differential value can be coded by a fixed number of codes, and a coding means which codes the differential value within the analyzing and coding range when the differential value is within the analyzing and coding range, while calculating a repetition number of the analyzing and coding range necessary for coding the differential value when the differential value is not within the analyzing and coding range, so as to code the differential value by the codes including a marker code representing the repetition number. On the other hand, the speech synthesizer includes a decoding means which obtains the differential value of the adjacent speech signals through calculation of the repetition number of the above range on the basis of the marker code included in the codes. Accordingly, in the speech analyzing and synthesizing apparatus, the inputted speech signal can be coded with simple operation into a variable length code by which the information content as a result of the coding is changed in accordance with the changing amount of the inputted speech signal, and moreover, a variable wavelength code can be decoded. Thus, it is advantageous that the average code length is able to be shortened to realize a low capacity memory and a well-analyzed and synthesized speech of good quality.

Second Embodiment

Figure 8:
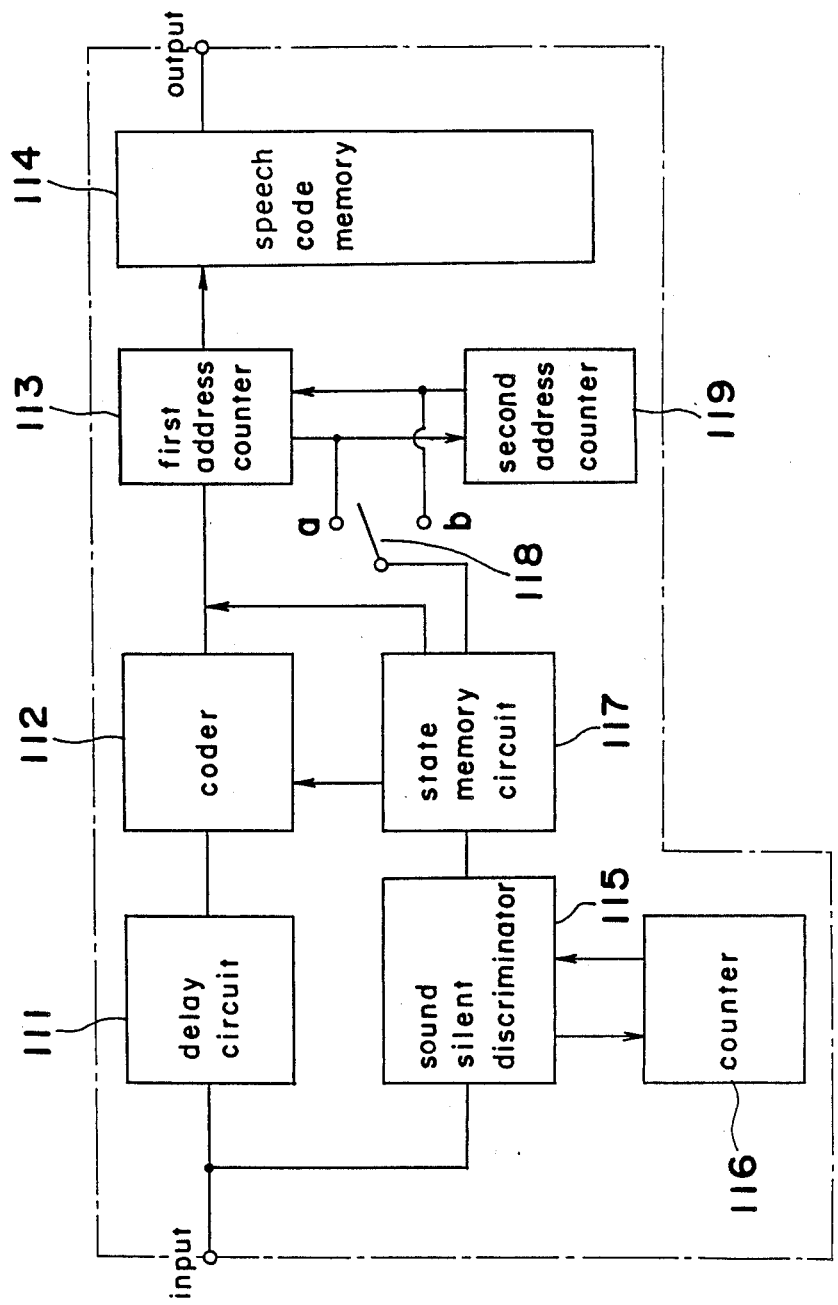
FIGS. 8 and 9 represent a second embodiment of the present invention.
Figure 9:
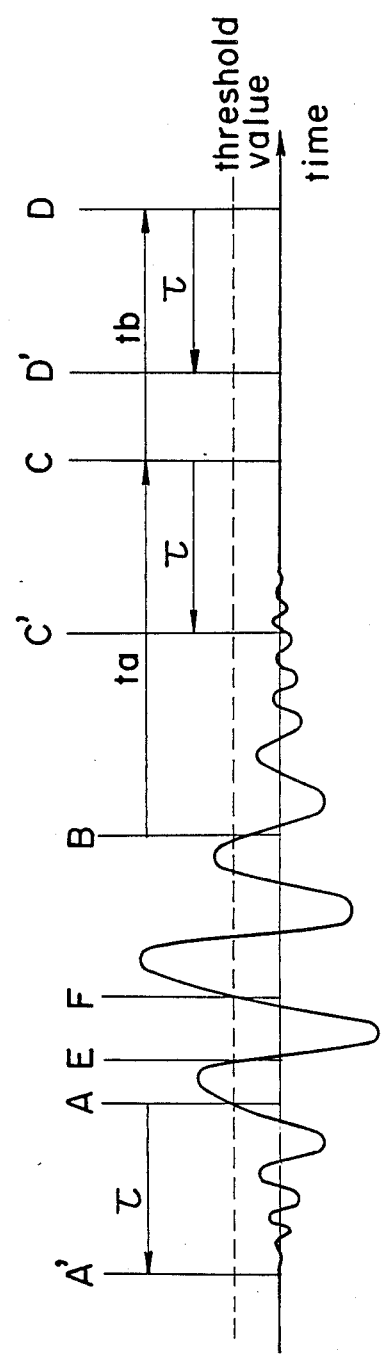

With reference to FIGS. 8 and 9, a speech recording apparatus with compression of soundless signals according to a second embodiment of the present invention which is a concrete arrangement of the speech analyzing and synthesizing apparatus of the first embodiment of the will be described hereinbelow.

In FIG. 8, the speech recording apparatus with compression of soundless signals is schematically illustrated by a delay circuit 111, an encoder 112, a first address counter 113, a speech code memory 114, a sound judgment circuit 115, a time counter 116, a state memory circuit 117, and a second address counter 119. The first address counter 113 is provided so as to designate the address of the speech code memory 114. Every time the speech code is inputted in the speech code memory 114, the address of the speech code memory 114 is advanced by the bit length of the speech code. The second address counter 119 is a register only for storing the value of the address. Further, the sound judgment means 115 judges per every sampling on the basis of, for example, comparison between the wave height value of the inputted speech waveform and the threshold value as a detection reference.

The speech recording apparatus having the above-described construction operates in the following manner.

Before recording, both the first and the second address counters 113 and 119 are initialized at the start position of the speech code memory 114. Then, the time counter 116 is initialized to set the state memory circuit 117 at the soundless position. When the state memory circuit 117 is in the soundless position, the encoder 112 is stopped.

(a) Detection of the beginning of a word

When the speech waveform is inputted to the input terminal, the data is inputted to the delay means 111, and at the same time, to the sound judgment means 115. The time counter 116 counts up the soundless time until the sound judgment means 115 detects that the inputted speech signal is a sounded signal. When it is detected by the sound judgment means 115 that the wave height value of the waveform in the sounded portion is higher than the threshold value, and accordingly the inputted speech signal is sounded, the state memory circuit 117 is set at the sounded position. Simultaneously, a signal (for instance, a soundless marker) indicating that the waveform segment is soundless, and the length of the soundless time are coded to be recorded in a predetermined address of the speech code memory 114 in accordance with instruction by the first address counter 113. Thereafter, the time counter 116 is initialized, and concurrently, a start signal is outputted to the encoder 112. Consequently, the encoder 112 codes a speech signal which has passed through the delay means 111 to be delayed, for example, by a delay time Accordingly, a speech signal having a is preceding segment for the delay time : is coded. In the manner as described above, the coding is started from the delay time before the time point when the waveform is detected to be sounded, and accordingly, the beginning of a word is prevented from being omitted (that is, it is prevented that the beginning of a word is erroneously judged to be soundless in coding).

A clearer illustration of the determination of the beginning of the word will be described with reference to FIG. 9. The inputted speech waveform has its wave height value exceeding the threshold value at the point A, and the sound judgment means 115 decides that the inputted speech signal is a sounded signal, starting the encoder 112. Although the encoder 112 starts coding from the time point A, since the speech signal inputted to the encoder 112 is delayed by the time $\tau$, the inputted speech signal is coded from a point A' the time $\tau$ before from the point A. Therefore, the speech signals below the threshold value between the points A and A' are coded as sounded signals, without being omitted.

While the encoder 112 is carrying out coding once the sound judgment means 115 detects the inputted speech signal to be a sounded signal, the sound judgment means 115 detects whether the present inputted speech (which is not delayed) is sounded or soundless. If the present inputted speech is judged by the sound judgment means 115 to be soundless, the time counter 116 starts counting up, which is part of the informations necessary to detect that the speech signal is soundless. On the other hand, if the present inputted speech signal is detected to be sounded, the content of the time counter 116 is initialized. Accordingly, even when the wave height value is temporarily lower than the threshold value as at a point E due to the oscillation of the speech wave in the interval between the points A and B of FIG. 9, the wave height value becomes higher than the threshold value immediately at a next point F, and therefore the time counter 116 stops counting at once, to prevent an erroneous judgment of the sounded interval as soundless.

(b) Detection of the ending of a word

At the point B, since the wave height value is lower than the threshold value, the inputted speech is judged to be soundless, and accordingly the time counter 116 starts counting up of the soundless time. If the wave height value of the inputted waveform continues to be lower than the threshold value for a time period ta, the sound judgment means 115 decides that the present speech signal is a candidate for the ending of the word, thus outputting a signal to the state memory circuit 117 to connect a switch 118 to a terminal a. As a result, the present content of the first address counter 113 is stored in the second address counter 119. Thereafter, if the speech signal is judged to be soundless further for a time tb, the sound judgment means 115 decides that the time point after the time ta is the ending of the word. Therefore, the time counter 116 is initialized, and at the same time, the state memory circuit 117 is set to be in the soundless position, thereby to stop the encoder 112. Moreover, the switch 118 is connected to a terminal b so as to return to the first address counter 113 the address value corresponding to the time point when the inputted speech signal is judged as a candidate for the ending of the word that is stored in the second address counter 119.

More concrete operation of the detection of the ending of a word will be described with reference to FIG. 9. The sound detection means 115 makes the judgment that the inputted speech signal is soundless from the speech waveform thereof, at the time point B. The content in the first address counter 113 is stored at the time point C which is the time ta after the time point B. At this time point C, the speech which is actually coded is delayed by the time $\tau$, and accordingly the content of the first address counter 113 is an address corresponding to a time point C' which is delayed the time $\tau$ from the time point C after the lapse of the time ta from the time point B. If the judgment that the inputted speech signal is soundless further continues for the time tb, the content of the first address counter 113 is advanced to an address corresponding to a time point D' which is delayed by the time $\tau$ from the time point D the time tb later than the time point C. At this time point D, the above candidate for the ending of the word is decided as the ending of the word, with the content of the second address counter 119 being transmitted to the first address counter 113, so that the content of the first address counter 113 accessing to the speech code memory 114 is returned to the address corresponding to the time point C'. Accordingly, the address in the speech code memory 114 in which the speech code is written decremented from the address at the time point D'. Thereafter, the operation is moved to the detection of the beginning of the next word. Thus, the soundless section between the time points C' and D' can be compressed by real time, and the memory capacity can be reduced or the memory can be effectively utilized to a large extent. Moreover, the speech signal below the threshold value between the time points B and C' is not omitted and is coded as a sounded signal. In such case as described above, it is necessary in order to code the speech signal in the section between the time points B and C' for the times $\tau$ and ta to satisfy the relationship ta$>\tau$, and the difference therebetween, ta-$\tau$ (namely, the length between time points B and C') should be set with consideration of the length of the ending of the word. Further, because of the setting of the time ta, even such short-time and weak sections as the double-consonant present in the sounded section are not judged to be a soundless section.

In reproducing the speech code recorded in the speech code memory 114, the speech code is read out from the speech code memory 114 to be judged as to whether it is a soundless marker code. If the read-out code is a soundless marker code, a next data stored is read out as a code indicating the length of the soundless time. Zero is outputted as a reproduction signal for the soundless time length. If the read-out code is not a soundless marker, the read-out code is inputted to the decoder to output a synthesized waveform.

As described above, according to the second embodiment of the present invention, the soundless section in the speech code memory 114 can be compressed by real time, thereby to reduce the memory capacity. Moreover, even the weak beginning of the word is not abandoned, but coded, resulting in no odd feeling in hearing when the speech code is reproduced.

In the foregoing second embodiment, since it is so arranged that the sound judgment means 115 judges as the ending of the word when the soundless condition lasts for a given time longer than the delay time of the delay means, even the ending of the word or the double-consonant portion is not judged to be soundless, and not omitted, but coded as a sounded portion. Moreover, the delay means can be realized by the common use of a part of the speech code memory, thereby simplifying the hardware of the apparatus.

As is clear from the foregoing description, according to the speech recording apparatus with compression of soundless signals, there are provided a sound judging means, a speech code memory, and address counters which are controlled by the sound judging means, so that the address of the speech code memory is advanced when the speech signal is a sounded signal, while the address of the speech code memory is turned back when the speech signal is a soundless signal. Therefore, the soundless section can be compressed in real time. In addition, there is further provided a delay means which delays the coded signal in the speech code memory relative to the speech signal inputted to the sound judgment means, and accordingly the sound judgment means can control storing of the preceding speech signal into the speech code memory. Thus, even a weak beginning head of the word can be coded as a sounded portion. Therefore, it is advantageous that the speech signal is able to be reproduced without any strange feeling in hearing.

Although the present invention has been fully described by way of example with reference to the accompanying drawings, it is to be noted here that various changes and modifications will be apparent to those skilled in the art. Therefore, unless other such changes and modifications depart from the scope of the present invention, they should be construed as being included therein.

What is claimed is:

1. A speech analyzing apparatus, comprising:
   sampling means for sampling an input speech signal;
   speech analyzer means for analyzing and coding said sampled speech signal, including
      differential detector means for obtaining a differential value equal to the difference between two adjacent samples of said sampled speech signal,
      judgment means for determining whether said differential value is within a coding range in which the latter of said two adjacent samples of said sampled speech signal can be coded with one of a predetermined number of codes,
      coding means for encoding said latter sample when said differential value is within said coding range, and
      marker code means for outputting a marker code representing the number of times said coding range must be multiplied to encompass said differential value when said differential value is outside said coding range and encoding said latter sample with one of said predetermined number of codes and said marker code.

2. An apparatus for storing coded sounded portions of an input speed signal while compressing soundless portions of said input speech signal in substantially real time, the apparatus comprising:
   input means for inputting said speech signal;
   delay means, operatively connected to said input means, for delaying said input speech signal for a predetermined time period ($\tau$);
   sound discriminating means, operatively connected to said input means, for receiving said input speech signal simultaneously to said delay means, and for judging said input speech signal at a real-time ($\tau$) to be in a soundless state or a sounded state;
   encoder means, operatively connected to said delay means, for sequentially coding said input speech signal at a delayed time ($t - \tau$);
   first address means, operatively connected to said encoder means, for sequentially counting at $t - \tau$ to designate an address location of a speech code memory means at which said coded input speech signal is stored;
   speech code memory means, operatively connected to said first address means, for sequentially storing said coded input speech signal at an address sequentially designated by said first address means;
   state memory means, operatively connected to said sound discriminating means and said encoder means, for starting said encoder means to code said input speech signal, upon receiving a judgment from said sound discriminating means indicating input speech signal is in a sounded state, and store said input speech signal in a sounded stated at sequentially designated address locations of said speech code memory means, designated by said first address means, wherein said judgment occurs at time t and said encoding occurs at delayed time $t - \tau$ thereby allowing for a smooth transition in coding the beginning and ending of said sounded state of said input speech signal;
   said sound discriminating means, upon judging said input speech signal to be in a soundless state, for a first predetermined period of time (ta), sending said judgment to said state memory means;
   said first address means, upon receiving the judgment of a soundless state of said input speech signal from said state memory means, storing its address count as a startup count in a second address means;
   said second address means, operatively connected to said state memory means and said first address means, for sequentially counting address locations starting from said startup count;
   said state memory means, upon receiving a signal from said sound discriminating means, indicating a judgment that said input speech signal has remained in a soundless state for a second predetermined period (tb), stopping said encoder means and initiating a transfer of the address count in the second address means to the first address means, wherein said input speech signal in a soundless state is compressed in substantially real-time and only said input speech signal in a sounded state has thus been coded and stored in said speech code memory means.

3. An apparatus, as claimed in claim 2, further comprising:
   time counting means, operatively connected to said sound discriminating means, for initiating a time count upon receiving a judgment from said sound discriminating means indicating that said input speech signal is in a soundless state, and for being initialized upon receiving a judgment from said sound discriminating means indicating said input speech signal is in a sounded state.

4. An apparatus, as claimed in claim 2, further comprising:
   a switch, operatively connected to said state memory means and said first and second address means, for initiating a transfer of an address count from said first address means to said second address means when in a first state, and for initiating a transfer of an address count from said second address means to said first address means when in a second state.

5. An apparatus, as claimed in claim 4, wherein:
said state memory means, upon receiving the judgment of a soundless state of said input speech signal, after a first predetermined time period (ta), from said sound discriminating means, switches said switch to said first state; and
said state memory means, upon receiving the judgment of a soundless state of said input speech signal, after a second predetermined time period (tb), from said sound discriminating means, switches said switch to said second state.

6. An apparatus, as claimed in claim 2, wherein:
said sound discriminating means judges said input speech signal to be in a sounded state when said input speech signal is above a predetermined threshold; and
said sound discriminating means judgments said input speech signal to be in a soundless state when said input speech signal falls below a predetermined threshold.

7. A method of coding and storing sounded portions of an input speech signal and compressing soundless portions of an input speech signal in substantially real-time, said method comprising the steps of:
(a) inputting a speech signal;
(b) delaying said input speech signal in a delay means;
(c) judging said input speech signal, by a judging means, simultaneous to said delaying of said input speech signal, to be in a sounded state when said input speech signal is above a predetermined threshold;
(d) sequentially encoding said delayed input speech signal, by an encoding means, upon acknowledgement of step (c) from said judging means;
(e) sequentially counting and designating addresses locations at which to store said sequentially encoded input speech signal, by utilizing a first address counter means;
(f) sequentially storing said encoded speech input signal at said sequentially designated address locations of a speech coded memory means;
(g) judging said input speech signal, by said judging means, to be in a soundless state when said input speech signal falls below a predetermined threshold;
(h) counting a first predetermined time period (ta), in a time counter means, upon receipt of a judgment that said input speech signal is in a soundless state;
(i) transferring the count of said first address counter means to a second address counter means upon receipt of a judgment that said input speech signal has been in a soundless state for a first predetermined time period (ta);
(j) sequentially counting a period of time in which said input speech signal is in a soundless state, in said second address counter means, utilizing said transferred count from said first address counter means as a starting address count;
(k) counting a second predetermined time period (tb), in said time counter means, indicating that said input speech signal remains in a soundless state;
(l) stopping the sequential encoding of said delay input speech signal, by said encoding means, and transferring the count of said second address counter means to said first address counter means, upon receipt of a judgment that said input speech signal remains in a soundless state for a second predetermined time period (tb), thereby providing coding and storing of said input speech signal in a sounded state and compression of said input speech signal, in substantially real time, while in a soundless state.

8. A method, as claimed in claim 7, further comprising the steps of:
(m) inputting a second speech signal;
(n) repeating steps (b)–(l), thereby storing said encoded second input speech signal in a sounded state, starting at a position in said speech coded memory, directly following said sounded portion of said previously input signal, but at an address counter location which, if subtracted form said address location of the end of said sounded state of said previously input signal, would represent the amount of soundless state time existing between the first and second sounded states, thereby indicating the real-time compression of the soundless state of input signals.

9. A method, as claimed in claim 7, further comprising the steps of:
(m) repeating step (c) by judging said input speech signal to be in a second sounded state, following said soundless state, when said input speech signal is again above said predetermined threshold;
(n) repeating steps (d)–(f) to thereby sequentially encode and store said input speech signal during a second sounded state, wherein said input signal in said second sounded state is stored at a position next to said input speech signal in said initial sounded state, in said coded memory means, whereby the difference in the address counter locations at the end of the initial sounded state and at the beginning of the second sounded state, represents the amount of soundless state time existing between the initial and second sounded states.

10. A speech analyzing and synthesizing apparatus, comprising:
sampling means for sampling an input speech signal;
speech analyzer means for analyzing and coding said sampled speech signal, including
differential detector means for obtaining a differential value equal to the difference between two adjacent samples of said sampled speech signal;
judgment means for determining whether said differential value is within a coding range in which the latter of said two adjacent samples of said sampled speech signal can be coded with one of a predetermined number of codes,
coding means for encoding said latter sample when said differential value is within said coding range, and
marker code means for outputting a marker code representing the number of times said coding range must be multiplied to encompass said differential value when said differential value is outside said coding range and encoding said said latter sample with one of predetermined number of codes and said marker code; and
speech synthesizer means for synthesizing a speech signal, including,
decoder means, receiving said coded sampled speech signal, for decoding one of a predetermined number of codes in each previously encoded sample of said coded sampled speech signal;

judgment means, receiving said coded sampled speech signal simultaneously to said decoder means, for detecting whether a marker code is present in each of said previously encoded sample of said coded sampled speech signal and if said marker code is present, outputting a signal inhibiting an output signal from said decoder means;

said decoder means outputting each of said decoded samples of said coded sampled speech signal to a converting means if no inhibit signal was received from said judgment means and, decoding the number of times each of said encoded sampled of said coded sampled speech signal has been multiplied in response to said detected marker code if an inhibit signal was received from said judgment means, and outputting each of said decoded samples to said converting means;

said judgment means outputting a noninhibit signal upon detecting that said decoder means has decoded the number of times each of said encoded samples have been multiplied in response to said detected marker code;

said converting means converting each of said decoded samples of said sampled speech signal into an output speech signal.

11. An apparatus, as claimed in claim 10, wherein said converting means comprises:

digital to analog converting means for converting each of said decoded samples into an output speech signal.

* * * * *